United States Patent
Dede et al.

(10) Patent No.: US 10,196,982 B2
(45) Date of Patent: Feb. 5, 2019

(54) GAS TURBINE ENGINE HAVING A FLOW CONTROL SURFACE WITH A COOLING CONDUIT

(71) Applicant: General Electric Company, Schenectady, NY (US)

(72) Inventors: Mehmet Muhittin Dede, Liberty Township, OH (US); Satoshi Atsuchi, Rexford, NY (US); Byron Andrew Pritchard, Loveland, OH (US); Erich Alois Krammer, West Chester, OH (US); Giridhar Jothiprasad, Clifton Park, NY (US); Shourya Prakash Otta, Clifton Park, NY (US); Corey Bourassa, Mechanicville, NY (US)

(73) Assignee: General Electric Company, Schenectady, NY (US)

( * ) Notice: Subject to any disclaimer, the term of this patent is extended or adjusted under 35 U.S.C. 154(b) by 507 days.

(21) Appl. No.: 14/932,162

(22) Filed: Nov. 4, 2015

(65) Prior Publication Data

US 2017/0122209 A1    May 4, 2017

(51) Int. Cl.
F02C 7/18    (2006.01)
F02C 9/18    (2006.01)
(Continued)

(52) U.S. Cl.
CPC ............... *F02C 7/18* (2013.01); *F01D 5/081* (2013.01); *F01D 9/041* (2013.01); *F01D 9/065* (2013.01);
(Continued)

(58) Field of Classification Search
CPC .... F02C 7/18; F02C 7/052; F02C 9/18; F05D 29/44; F05D 29/444; F05D 29/54;
(Continued)

(56) References Cited

U.S. PATENT DOCUMENTS 3,394,543 A    7/1968   Slattery
3,694,102 A *  9/1972   Conrad .................. F04D 29/682
                                                       415/115
(Continued)

FOREIGN PATENT DOCUMENTS

CN    1232524 A    10/1999
EP    1 510 659 A2    3/2005
(Continued)

OTHER PUBLICATIONS

Extended European Search Report and Opinion issued in connection with corresponding EP Application No. 16197022.3 dated Mar. 23, 2017.
(Continued)

*Primary Examiner* — Gerald L Sung
*Assistant Examiner* — Alain Chau
(74) *Attorney, Agent, or Firm* — General Electric Company; William Andes (57) ABSTRACT

The invention relates to a gas turbine engine comprising a casing having a compressor section, combustion section and turbine section, axially arranged in a flow direction about a rotational axis of the engine. The engine includes a rotor located within the casing and rotatable about the rotational axis, including multiple sets of circumferentially arranged blades, with at least one set corresponding to the compressor section and another set corresponding to the turbine section. The engine also includes a set of vanes circumferentially arranged about the rotational axis and at a location upstream of the combustion section, with the vanes having a pressure side and a suction side. The engine further includes a cooling conduit extending from upstream of the combustion section to downstream of the combustion section, with an inlet located on the suction side of at least one of the vanes which
(Continued)

allows cooling air to enter the inlet and is directed through the cooling conduit for cooling.

32 Claims, 5 Drawing Sheets

(51) Int. Cl.
| | |
|---|---|
| *F01D 9/06* | (2006.01) |
| *F02C 7/052* | (2006.01) |
| *F02C 6/08* | (2006.01) |
| *F01D 5/08* | (2006.01) |
| *F01D 9/04* | (2006.01) |
| *F04D 29/54* | (2006.01) |
| *F04D 29/58* | (2006.01) |
| *B01D 45/16* | (2006.01) |

(52) U.S. Cl.
CPC ................ *F02C 6/08* (2013.01); *F02C 7/052* (2013.01); *F02C 9/18* (2013.01); *F04D 29/542* (2013.01); *F04D 29/584* (2013.01); *B01D 45/16* (2013.01); *F05D 2240/124* (2013.01); *F05D 2250/51* (2013.01); *F05D 2260/232* (2013.01); *F05D 2260/607* (2013.01); *Y02T 50/671* (2013.01); *Y02T 50/676* (2013.01)

(58) Field of Classification Search
CPC ............. F05D 29/542; F05D 2260/607; F05D 2240/124; F01D 9/065; F01D 5/081; F04D 29/584

See application file for complete search history.

(56) References Cited

U.S. PATENT DOCUMENTS

| | | | | |
|---|---|---|---|---|
| 3,720,045 | A | * | 3/1973 | Murphy ................ B01D 45/14 415/115 |
| 4,463,552 | A | | 8/1984 | Monhardt et al. |
| 5,123,240 | A | | 6/1992 | Frost et al. |
| 5,211,003 | A | | 5/1993 | Samuel |
| 5,224,819 | A | * | 7/1993 | Kernon ................... F01D 9/041 415/115 |
| 5,632,141 | A | * | 5/1997 | Sloop .................... F01D 17/105 60/751 |
| 6,969,237 | B2 | * | 11/2005 | Hudson .................. F01D 5/081 416/231 B |
| 8,092,145 | B2 | | 1/2012 | Martel et al. |
| 8,529,195 | B2 | * | 9/2013 | Widener ................ F01D 5/085 415/115 |
| 9,574,452 | B2 | * | 2/2017 | Rose ....................... F01D 5/145 |
| 2006/0051199 | A1 | * | 3/2006 | Guemmer ............... F01D 5/143 415/144 |
| 2011/0067378 | A1 | * | 3/2011 | Tibbott ................... F01D 25/32 60/39.091 |
| 2013/0195610 | A1 | | 8/2013 | Rose et al. |
| 2015/0033729 | A1 | | 2/2015 | Bourassa et al. |
| 2016/0131037 | A1 | * | 5/2016 | Spangler ................ F01D 5/085 60/806 |

FOREIGN PATENT DOCUMENTS

| | | | | |
|---|---|---|---|---|
| GB | | 905262 A | * 9/1962 | ........... F04D 29/545 |
| WO | | 95/04225 A1 | 2/1995 | |
| WO | | 2014/134513 A1 | 9/2014 | |
| WO | WO | 2014134513 A1 | * 9/2014 | ................ F02C 7/06 |
| WO | | 2014197089 A2 | 12/2014 | |

OTHER PUBLICATIONS

First Office Action and Search issued in connection with corresponding CN Application No. 201610960764.4 dated Feb. 5, 2018.

* cited by examiner

GAS TURBINE ENGINE HAVING A FLOW CONTROL SURFACE WITH A COOLING CONDUIT

BACKGROUND OF THE INVENTION

Turbine engines, and particularly gas or combustion turbine engines, are rotary engines that extract energy from a flow of combusted gases passing through the engine onto a multitude of turbine blades. In the compressor stages, the blades are supported by posts protruding from the rotor while the vanes are mounted to stator structures. Gas turbine engines have been used for land and nautical locomotion and power generation, but are most commonly used for aeronautical applications such as for aircraft, including helicopters. In aircraft, gas turbine engines are used for propulsion of the aircraft. In terrestrial applications, turbine engines are often used for power generation.

Gas turbine engines for aircraft are designed to operate at high temperatures to maximize engine efficiency, so cooling of certain engine components, such as the high pressure turbine and the low pressure turbine, can be necessary. Typically, cooling is accomplished by ducting cooler air from the high and/or low pressure compressors to the engine components which require cooling. Temperatures in the high pressure turbine are around 1000° C. to 2000° C. and the cooling air from the compressor is about 500° C. to 700° C. While the compressor air is a high temperature, it is cooler relative to the turbine air, and can be used to cool the turbine. When cooling the turbines, cooling air can be supplied to various turbine components, including the interior of the turbine blades and the turbine shroud.

Particles, such as dirt, dust, sand, volcanic ash, and other environmental contaminants, in the cooling air can cause a loss of cooling and reduced operational time or "time-on-wing" for the aircraft environment. This problem is exacerbated in certain operating environments around the globe where turbine engines are exposed to significant amounts of airborne particles. Particles supplied to the turbine components via cooling circuits can clog, obstruct, or coat the flow passages and surfaces of the components, which can reduce the lifespan of the components. Turbine shrouds can have particulate accumulation on backside cooling surfaces, causing reduction in part life. In some cases the entire cooling surface of the shroud becomes coated with particles, with the additional negative impact of film-hole blockage.

BRIEF DESCRIPTION OF THE INVENTION

In one aspect, embodiments of the invention relate to a gas turbine engine comprising a casing having a compressor section, combustion section and turbine section, axially arrange in a flow direction about a rotational axis of the engine. The engine includes a rotor located within the casing and rotatable about the rotational axis, including multiple sets of circumferentially arranged blades, with at least one set corresponding to the compressor section and another set corresponding to the turbine section. The engine also includes a set of vanes circumferentially arranged about the rotational axis and at a location upstream of the combustion section, with the vanes having a pressure side and a suction side. The engine further includes a cooling conduit extending from upstream of the combustion section to downstream of the combustion section, with an inlet located on the suction side of at least one of the vanes.

In another aspect, embodiments of the invention relate to a flow control surface for use in the interior of a gas turbine engine, in which the flow control surface comprises an airfoil having a suction side and pressure side extending chord-wise between a leading edge and a trailing edge, and extending span-wise between a root and at tip. The engine further includes a cooling conduit extending through the airfoil and a scoop formed in the suction side and defining an inlet fluidly coupled to the cooling conduit.

DESCRIPTION OF EMBODIMENTS OF THE INVENTION

The described embodiments of the present invention are directed to a turbine blade, and in particular to cooling a turbine blade. For purposes of illustration, the present invention will be described with respect to a turbine blade for an aircraft gas turbine engine. It will be understood, however, that the invention is not so limited and can have general applicability in non-aircraft applications, such as other mobile applications and non-mobile industrial, commercial, and residential applications. It can also have application to airfoils, other than a blade, in a turbine engine, such as stationary vanes.

Figure 1:
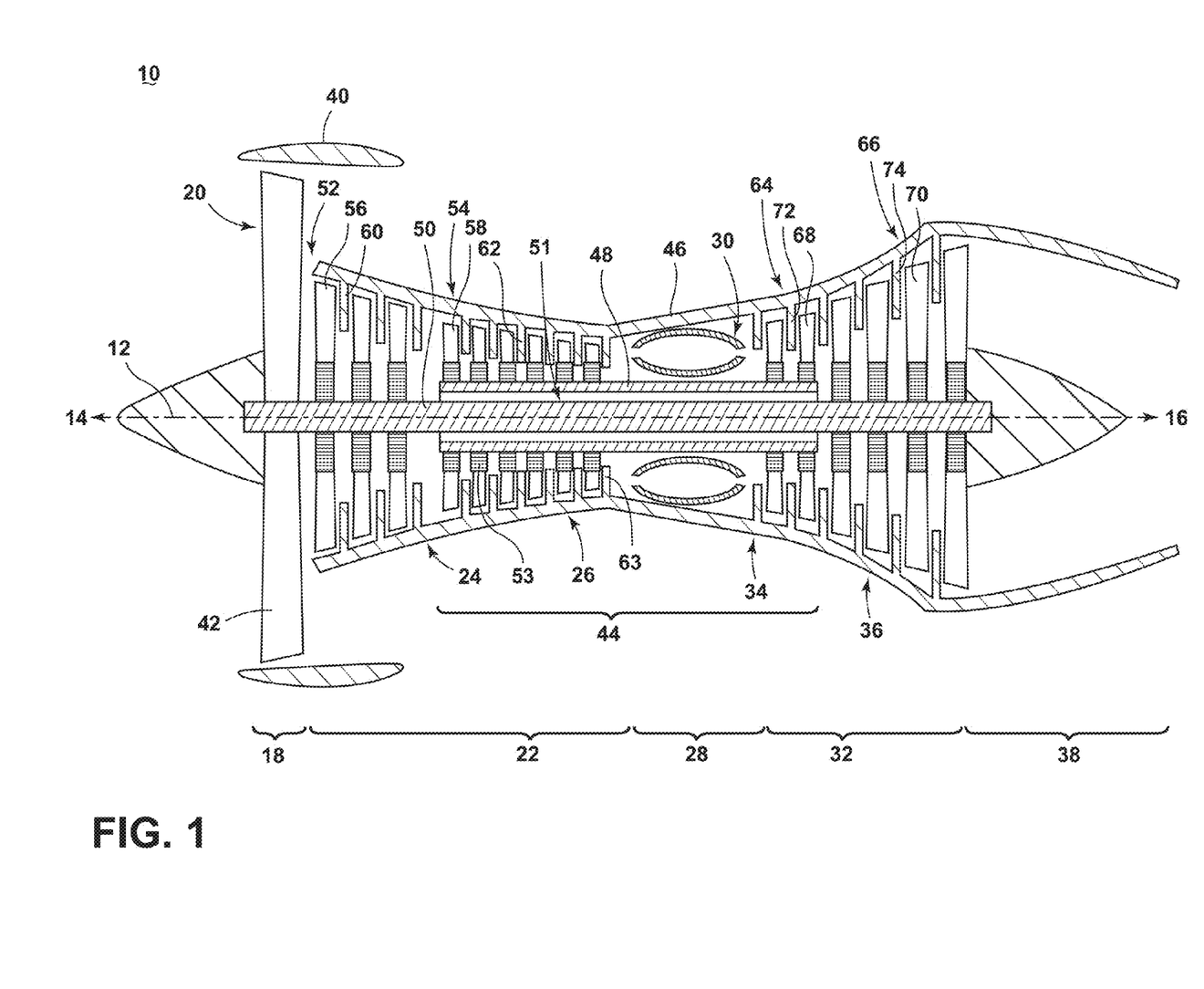
FIG. 1 is a schematic cross-sectional diagram of a gas turbine engine for an aircraft having a compressor section, combustion section, and turbine section in axial flow arrangement.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The portions of the engine 10 mounted to and rotating with either or both of the spools 48, 50 are also referred to individually or collectively as a rotor 51.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned downstream of and adjacent to the rotating blades 56, 58. It is noted that the number of blades, vanes, and compressor stages shown in FIG. 1 were selected for illustrative purposes only, and that other numbers are possible. The blades 56, 58 for a stage of the compressor can be mounted to a disk 53, which is mounted to the corresponding one of the HP and LP spools 48, 50, with each stage having its own disk. The vanes 60, 62 are mounted to the core casing 46 in a circumferential arrangement about the rotor 51.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

In operation, the rotating fan 20 supplies ambient air to the LP compressor 24, which then supplies pressurized ambient air to the HP compressor 26, which further pressurizes the ambient air. The pressurized air from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

Some of the ambient air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but is not limited to, fluid discharged from the LP compressor 24 or the HP compressor 26.

Figure 2:
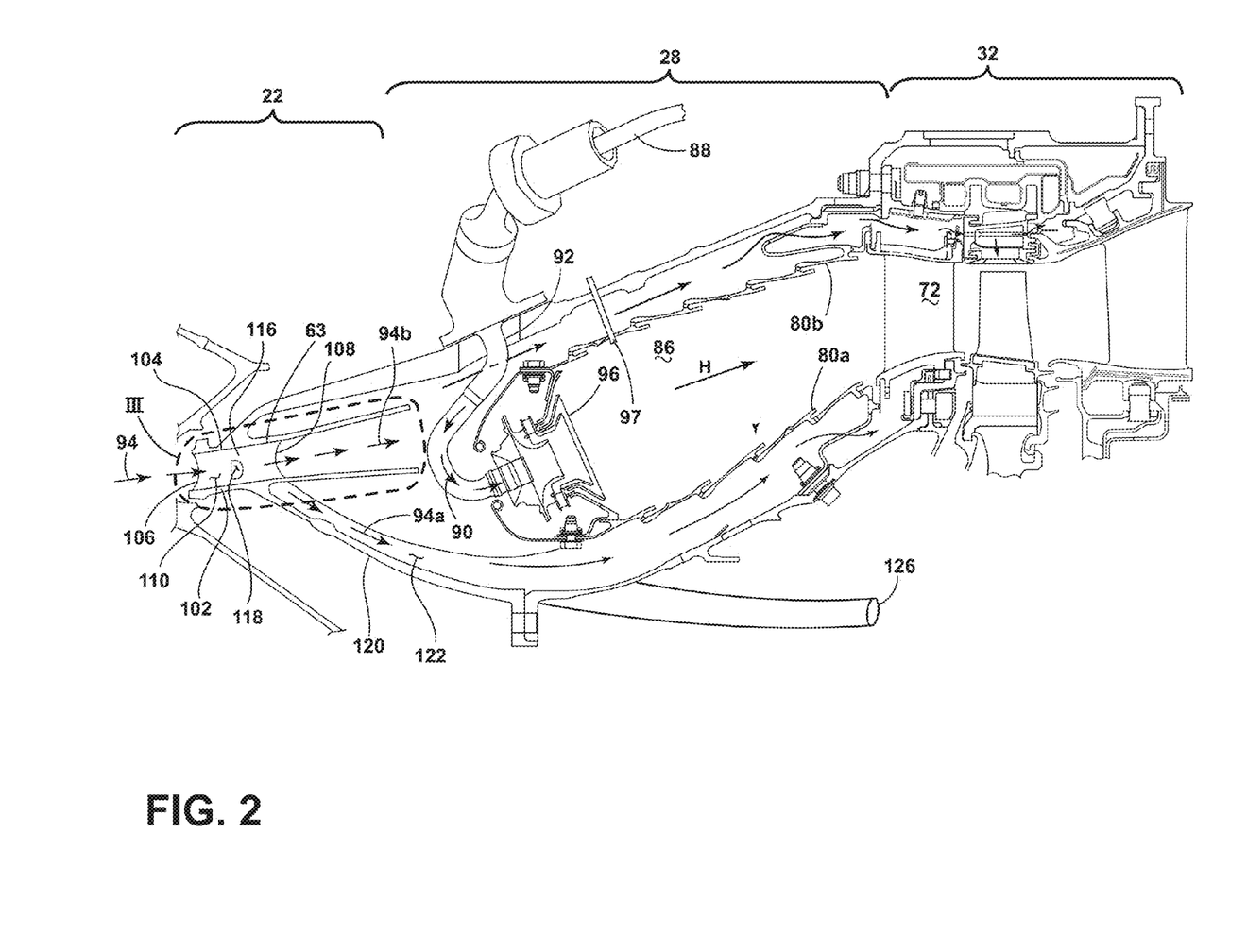
FIG. 2 is an enlarged, schematic cross-sectional partial view of the gas turbine engine from FIG. 1 and illustrating a cooling conduit extending from an outlet guide vane of the compressor section to the turbine section.

FIG. 2 is a side section view of an exemplary implementation of the gas turbine engine 10 spanning from the end of the compressor section 22 to the beginning of the turbine section 32, and showing all of the combustion section 28, especially the combustor 30 from FIG. 1. The combustor 30 includes combustion inner and outer liners 80a and 80b defining a combustion chamber 86 in fluid communication with HP compressor 26 and HP turbine 34. A fuel source 88 supplies a fuel 90 through supply lines 92 to fuel air mixer 96. An igniter 97 located in the combustor outer liner 80b ignites the fuel air mixture and the combustion process starts. Once the combustion process starts there is no need for ignition anymore. Supply lines 92 are configured to discharge fuel 90 into chamber 86 such that fuel 90 mixes with compressed air 94 from HP compressor 26. The fuel air mixer 96 located within the combustor 30 downstream of the compressor section 22 is configured to continue the combustion process with steady supply of the compressed air 94 and fuel 90. In chamber 86, energy is released when compressed cooling air 94 is mixed with fuel 90 and continuously supplied to the combustion chamber. The resulting flow of hot gases from combustor 30, is then directed over turbine blades 68, 70, the flow of working fluid inducing the rotation of turbine blades 68, 70. The energy of the flow of working fluid is transformed into the mechanical energy.

HP Compressor 26 includes a vane 62 which in an exemplary embodiment is an outlet guide vane 63, referred to from now on simply as an OGV, functioning as the fluid inlet to a cooling conduit 120, which extends to the turbine section 32. The OGV 63 is configured in fluid communication with compressor vanes 60, 62 and blades 56, 58 and is configured to receive a compressed cooling air 94 from the compressor vanes 60, 62 and blades 56, 58. The OGV 63 has an inlet 118 that is fluidly coupled to the cooling conduit 120. The inlet 118 provides for the extraction of the compressor air that is flowing over the OGV 63 and provides it to the cooling conduit 120 for re-direction to the turbine section 32. In this way, the cooler air from the compressor section 22 can be routed through the OGV 63, into the cooling conduit 120, where it bypasses the combustion section 28, and is supplied to the turbine section 32 as needed for cooling of the hotter components of the turbine section.

The cooling conduit 120 extends from the inlet 118 to an outlet 126 at the turbine section 32. The cooling conduit 120 thus defines a cooling air flow path 122 of cooling air 94 flowing from the inlet 118 to the outlet 126 supplying cooling air 94 from the compressor section 22 to the turbine section 32. The engine 10 can further include multiple cooling conduits 120 having a corresponding inlet 118 and outlet 126 wherein the inlet 118 is located on different vanes 62. The cooling conduit 120 can exit the OGV 63 comprising an airfoil at the root 102 or the tip 104.

Figure 3:
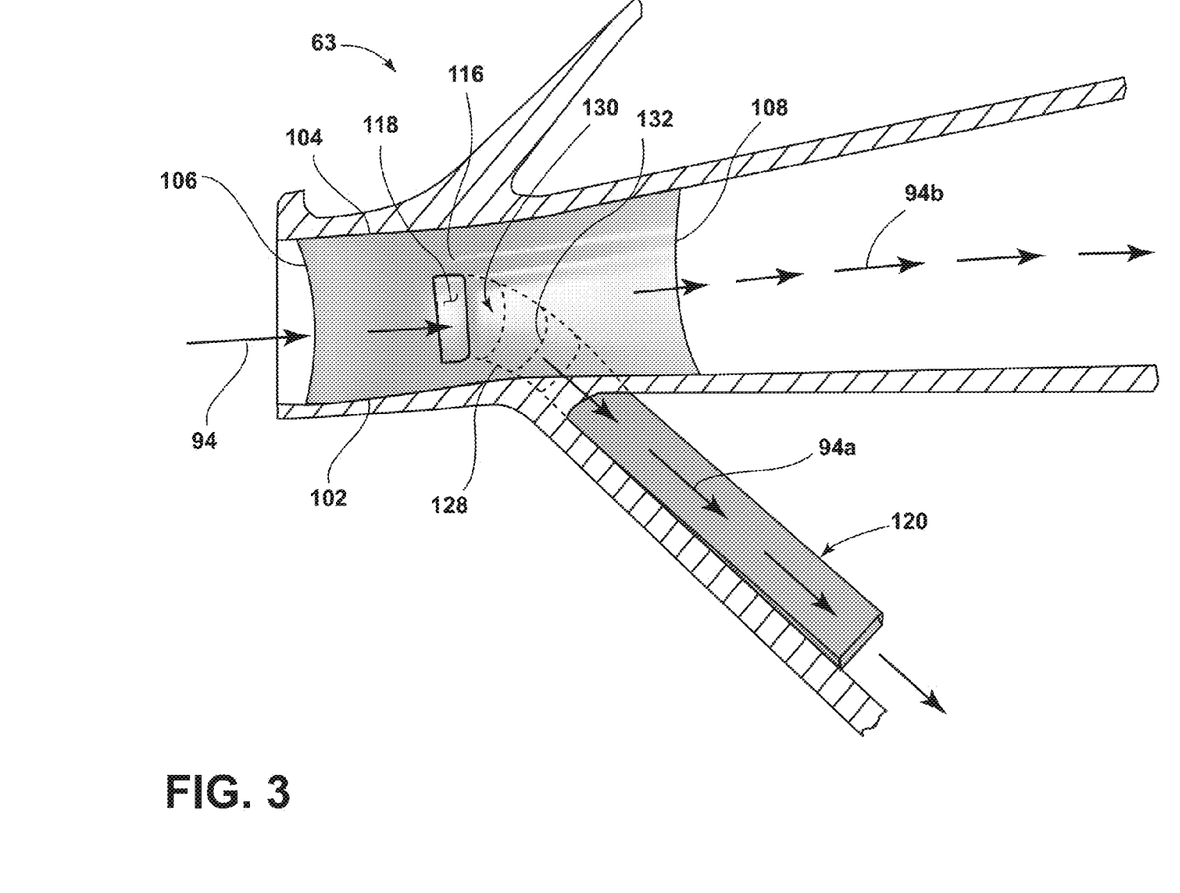
FIG. 3 is a schematic view of a suction side of the outlet guide vane having an internal cooling conduit supplied by a scoop on the suction side.

FIG. 3 is a schematic of the OGV 63 extending span-wise from a root 102 to a tip 104 and chord-wise from a leading edge 106 located on the upstream side of the OGV 63 to a trailing edge 108 on the downstream side. The cooling air 94 enters at the leading edge 106 and flows along OGV 63 toward the trailing edge 108. In the exemplary embodiment, a mid-span portion 116 is located between the root 102 and the tip 104, the inlet 118 is located at this mid-span portion where the cooling conduit 120 begins.

The cooling conduit 120 comprises a turn 128 downstream of the inlet 118 through which the cooling air 94 is directed. The turn is shaped to limit pressure loss. The cooling conduit 120 further comprises a reduced cross sectional area 130 to accelerate air flowing through the conduit 120. In an exemplary embodiment the reduced cross-sectional area 130 comprises a continuously reducing cross-sectional area 132.

Figure 4:
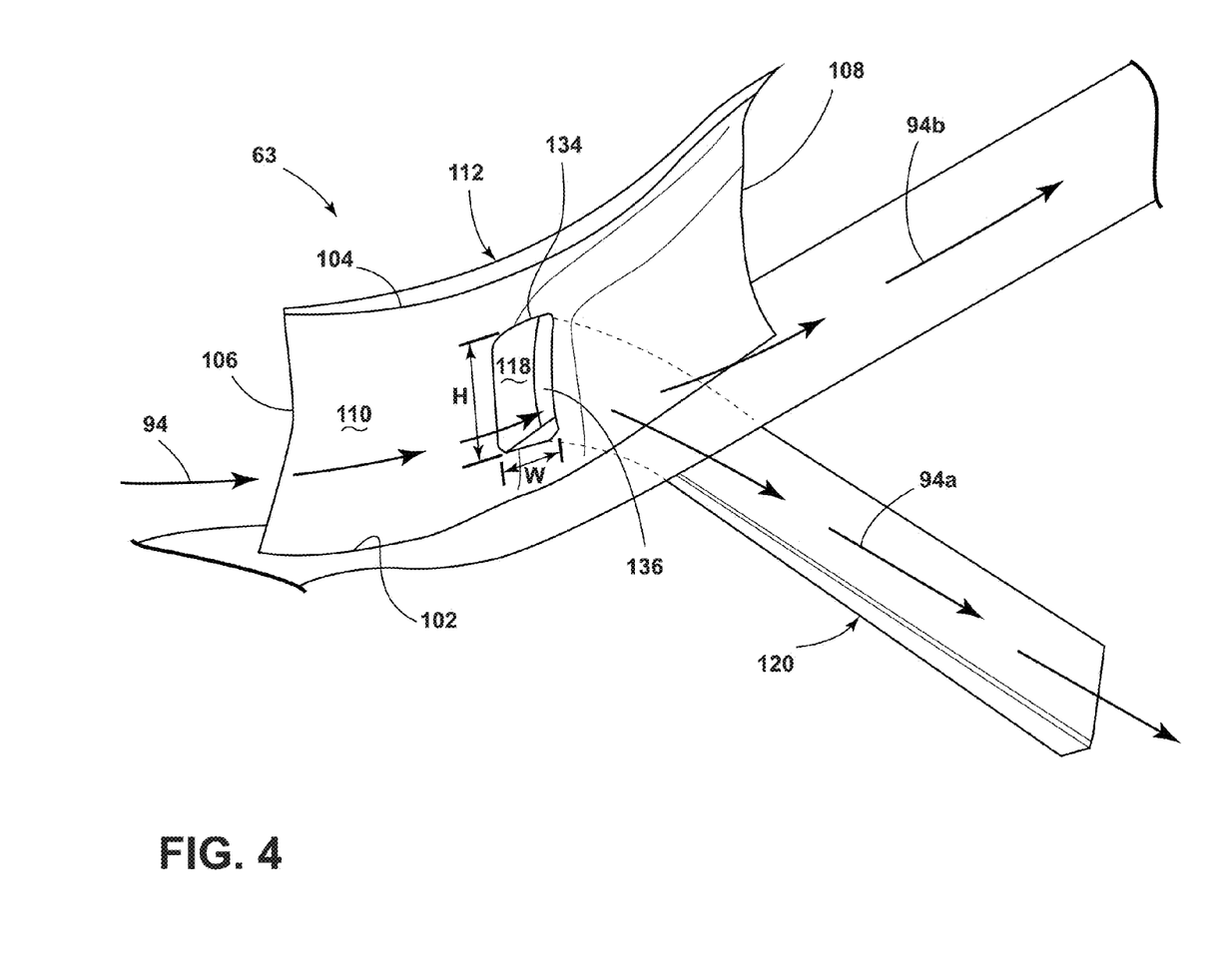
FIG. 4 is a perspective view of the outlet guide vane of FIG. 3.

FIG. 4 further illustrates the OGV 63 as a flow control surface comprising an airfoil shape wherein the OGV 63 comprises a suction side 110 and a pressure side 112 wherein the OGV 63 has a turning that de-swirls the flow from the HP compressor 26 via turning of the flow from a predominantly axial direction. The inlet 118 is located on the suction side 110 where a reduced particle flow 94a is present during operation. The reduced particle flow 94a is defined as a flow with less than 25% of particles found in the remainder flow. The location of the inlet 118 on the suction side 110 acts as a particle separator in that the reduced particle flow 94a travels through the cooling conduit 120 leaving a remainder flow 94b to continue travelling towards the trailing edge of the OGV 63.

The inlet is located radially at a location where a low temperature area of the air flowing over the OGV exists, in an exemplary embodiment this is the mid-span portion 116. The inlet 118 allows fluid communication between the suction side 110 and the cooling conduit 120 wherein the inlet 118 comprises a scoop 134 having a mouth 136 defining the inlet 118. In the exemplary embodiment the height H of the mouth is 10%-80% radial span and the width W of the mouth is 5%-50% radial span. The scoop 134 functions to more directly divert the compressor air into the inlet 118 as compared to if the inlet 118 were just an opening within the surface.

Figure 5:
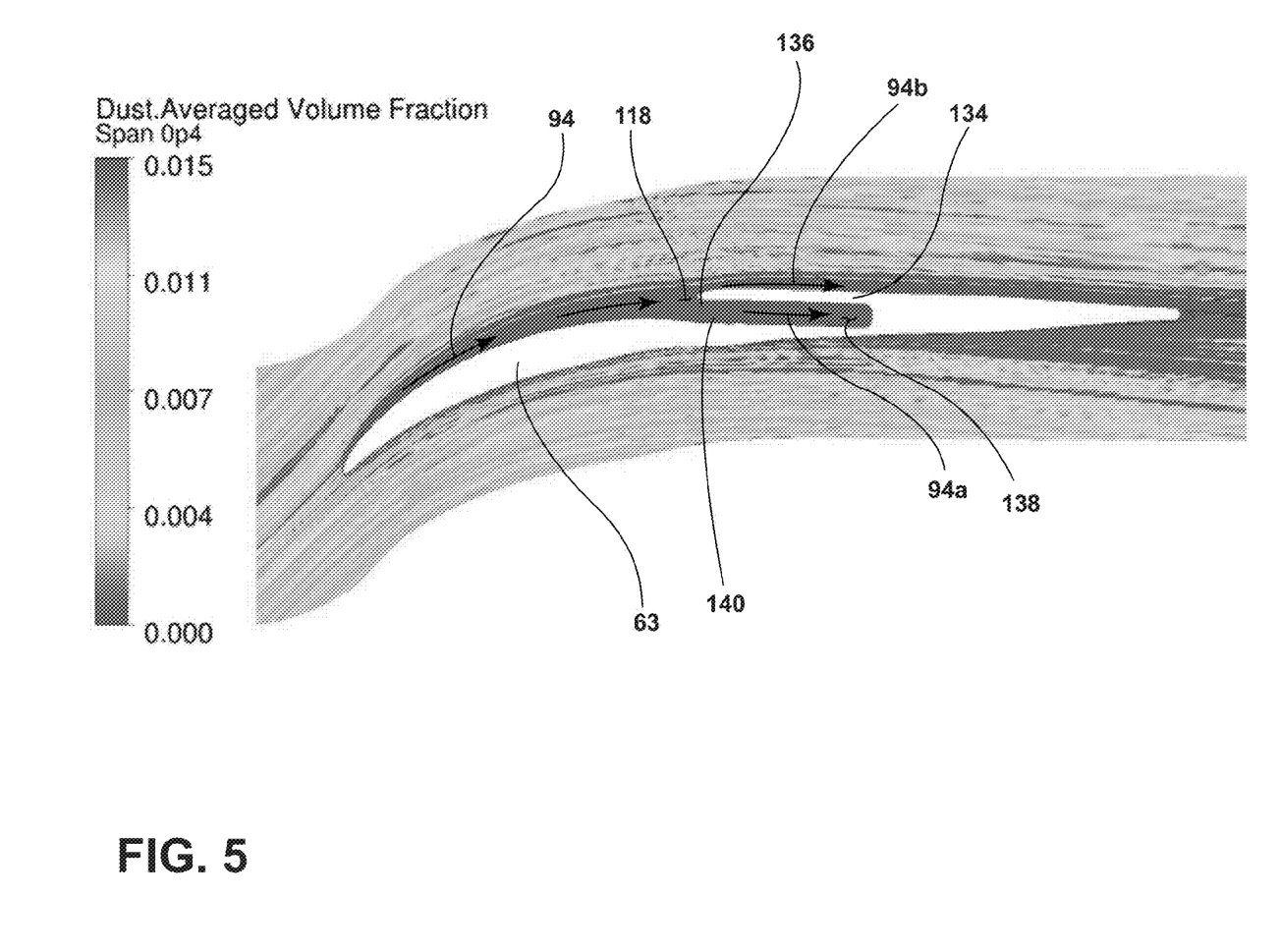
FIG. 5 is a cross-sectional diagram of the outlet guide vane of FIG. 3.

Referring now to FIG. 5 it is illustrated how the location of the inlet 118 on the suction side 110 can be selected such that the inlet 118 is positioned in the area of the cooling air 94 over the OGV 63 having the reduced particle flow 94a. FIG. 5 illustrates the airflow around a chord-wise cross section of the OGV 63, with the airflow being shaded to reflect the location of particles within the airflow. As is seen, on the suction side 110, there is a reduced particle flow adjacent suction side, which increases in height going downstream. This reduced particle flow occurs because the inertia of the particles prevents them from making the turn to follow the curvature of the suction side. Therefore, the inlet 118 can be strategically placed within this reduced particle flow, which functions as a particle separator. With this phenomena in mind, the inlet 118 and/or scoop 134 can be strategically located within the reduced particle flow to draw in air from the reduced particle flow. In this manner the inlet 118 or scoop can follow the contour line of the suction side 110 of the OGV 63 and the mouth 136 of the scoop 134 can have a height H that resides within the reduced particle flow region. A practical implementation is to locate the inlet 118 and/or scoop 134 just downstream of the peak of the suction side so that the reduced particle flow 94a will move into the mouth 136 as a path of least resistance but the remainder flow 94b will continue in a straight line parallel to the contour line of the suction side.

The OGV 63 can be shaped to enhance the reduced particle flow. For example, the OGV 63 can have a chamber 138 that results in a turning 140 or curvature of the suction side 110 to control the height of the reduced particle flow, which can aid in selecting the size of the inlet 118, especially the height of the mouth 136 for the scoop 134, as well as the location of the inlet on the suction side.

It should be appreciated that the particle separator is not limited to compressor exit outlet guide vanes. Clean air can be extracted from the suction side of any vane and then re-directed where it will be used for cooling.

It should be further appreciated that the particle separator as oriented is exemplary, and can be oriented in any direction, such as radial, axial, forward, aft, or any combination thereof, relative to the engine centerline, to define at least a portion of a cooling circuit within an engine component. The engine component, illustrated as a vane is also exemplary. Alternative engine components can comprise a hanger bracket or associated elements, or an engine blade comprising an airfoil shape similar to the vane.

It should be further appreciated that the particle separator operates to remove particles from a flow of cooling fluid. The system can be discriminative, removing a majority of particles based upon particle size, mass, or a combination thereof. As such, any particles remaining within the major flow can comprise a size or mass small to pass through remaining portions of the cooling circuit, such as the film holes, reducing associated clogging or damage to the components.

It should be further appreciated that the inlet as described herein is ideal for removing particles from a flow of cooling fluid passing through the vane or engine component. However, different particles separators can be utilized within the system in order to achieve effective cooling circuit while separating particles from the flow of cooling fluid.

This written description uses examples to disclose the invention, including the best mode, and to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A gas turbine engine comprising:
    a casing having a compressor section, combustion section and turbine section, axially arranged in a flow direction about a rotational axis of the engine;
    a rotor located within the casing and rotatable about the rotational axis, and having multiple sets of circumferentially arranged blades, with at least one set corresponding to the compressor section and another set corresponding to the turbine section;
    a set of vanes circumferentially arranged about the rotational axis and located upstream of the combustion section, wherein each vane of the set of vanes has a pressure side and a suction side; and
    a cooling conduit extending from upstream of the combustion section to downstream of the combustion section, with an inlet located on the suction side of at least one of the vanes of the set of vanes where a reduced particle flow is present during operation.

2. The gas turbine engine of claim 1 wherein the inlet is located on the suction side where the at least one of the vanes has a turn greater than 5 degrees.

3. The gas turbine engine of claim 1 wherein the inlet is located radially on the suction side at a location where a low temperature area of air flowing over the at least one of the vanes exists during operation.

4. The gas turbine engine of claim 3 wherein the inlet is located mid-span of the at least one of the vanes.

5. The gas turbine engine of claim 1 wherein the at least one of the vanes comprises a scoop having a mouth defining the inlet.

6. The gas turbine engine of claim 5 wherein a height of the mouth is 10%-80% a radial span of the at least one of the vanes.

7. The gas turbine engine of claim 6 wherein a width of the mouth is 5%-50% a radial span of the at least one of the vanes.

8. The gas turbine engine of claim 1 wherein the set of vanes are outlet guide vanes upstream of the combustion section.

9. The gas turbine engine of claim 8 wherein a cooling conduit outlet is located in the turbine section.

10. The gas turbine engine of claim 1 further comprising multiple cooling conduits each having a corresponding inlet and a corresponding outlet.

11. The gas turbine engine of claim 10 wherein the corresponding inlets are located on different vanes of the set of vanes.

12. The gas turbine engine of claim 10 wherein the corresponding inlets are located on all vanes of the set of vanes.

13. The gas turbine engine of claim 1 wherein the cooling conduit extends to a turbine rotor.

14. The gas turbine engine of claim 1 wherein the cooling conduit comprises a turn downstream of the inlet.

15. The gas turbine engine of claim 14 wherein the turn is shaped to limit pressure loss through the turn.

16. The gas turbine engine of claim 15 wherein the cooling conduit comprises a reduced cross-sectional area downstream of the turn to accelerate air flowing through the conduit.

17. The gas turbine engine of claim 16 wherein the reduced cross-sectional area comprises a continuously reducing cross sectional area.

18. A flow control surface for use in the interior of a gas turbine engine, the flow control surface comprising:
    an airfoil having a suction side and pressure side extending chord-wise between a leading edge and a trailing edge, and extending span-wise between a root and at tip;
    a cooling conduit extending through the airfoil; and
    a scoop formed in the suction side and defining an inlet fluidly coupled to the cooling conduit and located on the suction side where a reduced particle flow is present during operation.

19. The flow control surface of claim 18 wherein the cooling conduit outlets the airfoil at one of the root or tip.

20. The flow control surface of claim 18 wherein the airfoil comprises one of a blade or a vane.

21. The flow control surface of claim 18 wherein the scoop is located on the suction side where the airfoil has a turn of greater than 5 degrees.

22. The flow control surface of claim 18 wherein the scoop is located on the suction side at a location where a low temperature area of the air flowing over the airfoil during operation.

23. The flow control surface of claim 22 wherein the scoop is located mid-span of the airfoil.

24. The flow control surface of claim 18 wherein the airfoil comprises a mouth defining the scoop.

25. The flow control surface of claim 24 wherein a height of the mouth is 10%-80% a radial span of the airfoil.

26. The flow control surface of claim 25 wherein a width of the mouth is 5%-50% a radial span of the airfoil.

27. A flow control surface for a turbine engine, the flow control surface comprising:
    an airfoil having a suction side and pressure side extending chord-wise between a leading edge and a trailing edge, and extending span-wise between a root and a tip;
    a cooling conduit extending through the airfoil; and
    a scoop formed in the suction side and defining an inlet fluidly coupled to the cooling conduit and located on the suction side where a reduced particle flow is present during operation.

28. The flow control surface of claim 27 wherein the cooling conduit exits the airfoil at one of the root or tip.

29. The flow control surface of claim 27 wherein the airfoil comprises one of a blade or a vane.

30. The flow control surface of claim 27 wherein the scoop is located on the suction side where the airfoil has a turn of greater than 5 degrees.

31. The flow control surface of claim 27 wherein the scoop is located on the suction side at a location where a low temperature area of the air flowing over the airfoil exists during operation.

32. The flow control surface of claim 31 wherein the scoop is located mid-span of the airfoil.

\* \* \* \* \*